United States Patent
Andoche et al.

(10) Patent No.: US 12,456,139 B2
(45) Date of Patent: Oct. 28, 2025

(54) PREDICTING AN OPTICAL EQUIPMENT FOR A GIVEN PERSON

(71) Applicant: Essilor International, Charenton-le-Pont (FR)

(72) Inventors: Julien Andoche, Charenton-le-Pont (FR); Estelle Netter, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 350 days.

(21) Appl. No.: 17/904,065

(22) PCT Filed: Feb. 11, 2021

(86) PCT No.: PCT/EP2021/053318
§ 371 (c)(1),
(2) Date: Aug. 11, 2022

(87) PCT Pub. No.: WO2021/160731
PCT Pub. Date: Aug. 19, 2021

(65) Prior Publication Data
US 2023/0115374 A1 Apr. 13, 2023

(30) Foreign Application Priority Data
Feb. 12, 2020 (EP) .................................. 20305130

(51) Int. Cl.
*G06Q 30/00* (2023.01)
*G06Q 30/0282* (2023.01)
*G06Q 30/0601* (2023.01)

(52) U.S. Cl.
CPC ..... *G06Q 30/0621* (2013.01); *G06Q 30/0282* (2013.01)

(58) Field of Classification Search
CPC ........................ G06Q 30/0621; G06Q 30/0282
(Continued)

(56) References Cited

U.S. PATENT DOCUMENTS

| | | | |
|---|---|---|---|
| 7,980,692 B2 * | 7/2011 | Fisher | .................... G02C 7/061 351/159.74 |
| 11,488,239 B2 * | 11/2022 | Goldberg | ............. G02C 13/005 |

(Continued)

FOREIGN PATENT DOCUMENTS

| | | |
|---|---|---|
| CN | 105264426 A | 1/2016 |
| EP | 3 598 208 A1 | 1/2020 |

(Continued)

OTHER PUBLICATIONS

Rodenstock: "On the road to perfect spectacles with the new Rodenstock Impression|IST® 3," www.rodenstock.com; Jan. 13, 2012; 2pgs. (Year: 2012).*

(Continued)

*Primary Examiner* — Robert M Pond
(74) *Attorney, Agent, or Firm* — Oblon, McClelland, Maier &Neustadt, L.L.P.

(57) ABSTRACT

A method for determining, for a given person, an optical equipment among a set comprising a plurality of optical equipments. The method further includes collecting a plurality of N reference datasets associated to at least one corresponding reference person and collecting a given dataset associated to the given person. Each dataset is indicative of a relative ranking of at least two optical equipments forming a reference subset of the set of optical equipments. The method further includes, based on the given dataset, selecting, among the plurality of N reference datasets, a group of R reference datasets, and predicting at least one optical equipment for the given person among the plurality of optical equipments.

20 Claims, 1 Drawing Sheet

(58) Field of Classification Search
    USPC .................................................. 705/26, 27
    See application file for complete search history.

(56) References Cited

U.S. PATENT DOCUMENTS

| | | |
|---|---|---|
| 2015/0055085 A1 | 2/2015 | Fonte et al. |
| 2015/0055086 A1 | 2/2015 | Fonte et al. |
| 2015/0154322 A1 | 6/2015 | Fonte et al. |
| 2015/0154678 A1 | 6/2015 | Fonte et al. |
| 2015/0154679 A1 | 6/2015 | Fonte et al. |
| 2015/0212343 A1 | 7/2015 | Fonte et al. |
| 2015/0293377 A1 | 10/2015 | Allione et al. |
| 2016/0062151 A1 | 3/2016 | Fonte et al. |
| 2016/0062152 A1 | 3/2016 | Fonte et al. |
| 2017/0068121 A1 | 3/2017 | Fonte et al. |
| 2017/0269385 A1 | 9/2017 | Fonte et al. |
| 2018/0247356 A1* | 8/2018 | Thompson ......... G06Q 30/0621 |
| 2018/0299704 A1 | 10/2018 | Fonte et al. |
| 2019/0146246 A1 | 5/2019 | Fonte et al. |
| 2019/0164210 A1* | 5/2019 | Kornilov ............. G06V 40/165 |
| 2020/0285081 A1 | 9/2020 | Fonte et al. |

FOREIGN PATENT DOCUMENTS

| | | |
|---|---|---|
| EP | 3 598 209 A1 | 1/2020 |
| JP | 2017-41281 A | 2/2017 |
| WO | WO 2015/027196 A1 | 2/2015 |

OTHER PUBLICATIONS

International Search Report issued Feb. 26, 2021, in PCT/EP2021/053318, filed Feb. 11, 2021, citing documents 1-13 and 15 therein, 3 pages.

Office Action issued Oct. 10, 2023, in corresponding Japanese Patent Application No. 2022-548765, 5 pages.

* cited by examiner

PREDICTING AN OPTICAL EQUIPMENT FOR A GIVEN PERSON

FIELD OF THE INVENTION

The present invention relates in general to data science, and in particular, to methods, computer programs, computer storage media and systems for determining optical equipments for a given person, and to optical equipments so determined.

BACKGROUND OF THE INVENTION

Optical equipments are becoming more and more complex, such that many attributes may differ from an optical equipment to another.

Lens attributes may include a lens material, a glass code, a power specification, an optical design such as a soft or a hard progressive lens design, . . . .

Lens attributes may further specify whether a lens is of a gradient-index type, whether a lens comprises a wavelength-specific filter or tint, whether a lens exhibits a given additional property such as anti-scratch, anti-reflective, anti-rain, anti-fog . . . .

Lens attributes may further comprise an indication of whether a lens may be adapted for a given usage, such as for business as usual (BAU), for a digital intensive usage, for driving, for sports . . . .

Frame attributes may relate to an eyeglass frame as a whole or to a specific part of a frame such as an eyepiece, a bridge, a temple, a hinge . . . Frame attributes may include a frame material, a frame shape, a frame color, a frame size . . . .

As the range of attributes of optical equipments is wide and ever expanding, online business and ECPs need to have some recommender engines to help them to push the right optical equipment at the right time to the consumers.

A known method for recommending a frame is based on a morphology of a consumer. Landmark features are detected on the face of the consumer from an imported photo or video, then morphological features are computed, and a matching score between the frames and the face is computed using a decision tree. An example of rule that may be applied using the decision tree is that: "the shape of the top of the frame should preferably follow the shape of the eyebrow".

Another known method for recommending a frame is based on analyzing a style/lifestyle/personality questionnaire. The consumer is first asked questions about his tastes and habits, then the recommendation is performed using a decision tree, or using content-based filtering.

Lifestyle and occupation of the consumer may also be used to select a design of a lens in an array, or to select one or more lens characteristics such as a specific optical design, a presence of an anti-reflective coating, a specific tint . . . .

Although the above methods allow recommending an optical equipment to a customer, it is required as a preliminary step that the customer either fills a questionnaire or imports a photo or a video. Both of these inputs are time-consuming for the customer, thus may be perceived as unpractical.

In this context, there is a need to be able to automatically score all available optical equipments or all the different attributes of the available optical equipments in a retailer catalogue.

SUMMARY OF THE INVENTION

Embodiments of the invention provide a method for determining, for a given person, an optical equipment among a set comprising a plurality of optical equipments, the method comprising:
  collecting a plurality of N reference datasets, each reference dataset being associated to at least one corresponding reference person, each reference dataset being indicative of a relative ranking of at least two optical equipments forming a reference subset of the set of optical equipments,
  collecting a given dataset associated to the given person, the given dataset being indicative of a relative ranking of at least two optical equipments forming a given subset of the set of optical equipments, each of the optical equipments forming the given subset being part of at least one reference subset,
  based on the given dataset, selecting, among the plurality of N reference datasets, a group of R reference datasets, R being a positive integer from 2 to N, and
  based on the selected group of R reference datasets, predicting at least one optical equipment for the given person among the plurality of optical equipments.

Embodiments of the invention further provide a computer program comprising one or more stored sequence/s of instructions that is accessible to a processor and which, when executed by the processor, causes the processor to carry out the steps of the above method.

Embodiments of the invention further provide a storage medium storing one or more stored sequence/s of instructions of the above computer program.

Embodiments of the invention further provide a system for determining an optical equipment among a set of predetermined optical equipments, the system comprising:
  a collecting unit configured to collect, for a given person, a given dataset, and
  a centralized treatment unit, comprising a processor operably connected to a memory storing a plurality of N reference datasets and to a communication interface with the collecting unit, the centralized treatment unit being configured to:
  receive, from the collecting unit, the given dataset,
  based on the given dataset, select, among a plurality of N reference datasets, a group of R reference datasets, N being a positive integer, R being a positive integer from 2 to N, and
  based on the selected group of R reference datasets, determining at least one optical equipment for the given person among a plurality of optical equipments.

Embodiments of the invention further provide an optical equipment among a set of predetermined optical equipments, the optical equipment being determined for a given person by a centralized treatment unit (CT) configured to:
  receive, from a collecting unit, a given dataset,
  based on the given dataset, select, among a plurality of N reference datasets, a group of R reference datasets, N being a positive integer, R being a positive integer from 2 to N, and
  based on the selected group of R reference datasets, determine the optical equipment for the given person among the set of predetermined optical equipments.

The methods, computer programs, storage media and systems above allow predicting the level of satisfaction of a given person, for example a customer, regarding one or several optical equipments to recommend them the more appropriate for their needs. The prediction is obtained based on a group of reference datasets which is selected based on a given dataset associated to the given person. This prediction may be provided to an eye care practitioner. This prediction may also be provided to the given person at an online website. By means of example, the optical equipments in the catalogue of a retailer may be filtered according to the prediction.

An advantage is that all available optical equipments are automatically scored to predict the most appropriate for the needs of any given user.

Another advantage is that the recommendation engine for performing the prediction is based on a collaborative database which may improve over time by collecting more reference datasets. Indeed, functionally, the plurality of reference datasets is a collaborative database. Considering a cohort of reference persons, for each reference person of the cohort, there may be provided a reference dataset associated to said reference person and indicating the preferences of said reference person. If for example two reference persons have the same preferences, then, a single reference dataset may be associated to both reference persons.

Another advantage is that the reference persons are not requested to provide a rating of all optical equipments. Indeed, each reference dataset indicates, for the reference person the reference dataset is associated to, how a sample from the plurality of optical equipments may be sorted from the most preferred one to the least preferred one. Each reference dataset thus indicates a partial ranking of the plurality of optical equipments by a reference person. Since the amount of information carried by a reference dataset is relatively low (as only a partial ranking of the plurality of optical equipments needs to be provided), it is thus easy to gather a large number of reference datasets. The larger the number of reference datasets the database comprises, the more accurate the prediction is, on average, for any given user.

In an embodiment, each dataset comprises, for each of the optical equipments forming the subset, at least a score indicating a level of satisfaction of said optical equipment for the person.

Scores allow quantifying, thus transforming subjective data from a person into objective values.

In an embodiment, collecting a reference dataset and/or collecting the given dataset comprises collecting, for each optical equipment of a subset, at least one optical equipment attribute associated to said optical equipment, collecting, for each collected optical equipment attribute, a attribute score associated to said optical equipment attribute, and determining, for each optical equipment of the subset, a score indicating a level of satisfaction of said optical equipment for the person based on the collected attribute scores.

Attribute scores allow finely discriminating the reasons why an optical equipment may be overall preferred to another, in order to more accurately predict an optical equipment to the given person.

In an embodiment, each dataset comprises, for each of the optical equipments forming the subset, at least one attribute score $S_{j,k}$, each attribute score being associated to an optical equipment attribute of said optical equipment, each score indicating a level of satisfaction of said optical equipment attribute for the person.

Each dataset comprising such attribute scores allow for a rich and homogenous database.

In an embodiment, the at least an optical equipment attribute is chosen among one or more of an optical lens attribute, an optical filter attribute, a lens treatment attribute, a frame attribute, an attribute of a head-mounted display (HMD) design, an attribute relative to the type and/or the control mode of an active lens.

In an embodiment, at least one dataset comprises a preference level associated to a group of optical equipments comprising at least a first optical equipment and a second optical equipment being both part of the subset, the preference level indicating a level of preference of at least said first and second optical equipments for the person.

Preference levels are a direct indication of comparing equipments between one another. Such direct indications allow comparing a large number of optical equipments reliably and consistently, without the risk of a drift. Indeed, when for example a person is requested to provide values on a scale of 1 to 10 to a large number of optical equipments, the values provided may be inconsistent since the person may be influenced by the last rated optical equipments. This risk is avoided when optical equipments are directly compared.

In an embodiment, collecting a reference dataset and/or collecting the given dataset comprises collecting, for a pair of optical equipments of the subset, at least a pair of optical equipment attributes comprising a first optical equipment attribute associated to the first optical equipment and a second optical equipment attribute associated to the second optical equipment, collecting, for said pair of optical equipment attributes, a attribute preference level indicating a level of preference of said first optical equipment attribute and said second optical equipment attribute for the person, and determining, for said pair of optical equipments of the subset, a preference level indicating a level of preference of said first and said second optical equipments for the person based on the collected attribute preference levels.

In an embodiment, said dataset comprises, for said pair of optical equipments, at least a attribute preference level associated to at least a pair of optical equipment attributes comprising a first optical equipment attribute associated to the first optical equipment and a second optical equipment attribute associated to the second optical equipment, said attribute preference level indicating a level of preference of said first optical equipment attribute and said second optical equipment attribute for the person.

Collecting attribute preference levels allows expliciting an overall preference level between two optical equipments. Indeed, different reference persons may have the same overall preference level between two specific optical equipments but for different reasons. By identifying which reference datasets not only share with the given dataset the same preference levels between optical equipments but also between attributes, it is possible to more accurately determine an optical equipment for the given person.

In an embodiment, collecting a reference dataset and/or collecting the given dataset comprises collecting the reference dataset and/or the given dataset directly from a feedback of the wearer or from a measurement.

Feedback or measurements are explicit or conscious inputs from the person.

In an embodiment, collecting a reference dataset and/or collecting a given dataset comprises providing access to digital behavior of the person, and analyzing the digital behavior of the person so as to extract person parameters.

Analyzing the digital content or the digital behavior of the person provides an implicit or unconscious evaluation which may be seamless for the person.

In an embodiment, the extracted person parameters comprise an implicit level of satisfaction, or an implicit level of perceived quality, or an implicit level of performance associated to each optical equipment of, respectively, the reference and/or the given subset.

In an embodiment, the reference dataset and/or the given dataset correspond to an explicitly expressed level of satisfaction, or an explicitly expressed level of perceived quality, or an explicitly expressed level of performance associated to each optical equipment of, respectively, the reference and/or the given subset.

In an embodiment, the method further comprises determining a plurality of optical equipments and predicting an optical equipment by selecting said optical equipment among the determined plurality of optical equipments.

Determining a plurality of optical equipments allows broadly filtering the plurality of optical equipments, then predicting an optical equipment from the determined optical equipments allows finely selecting the most adequate optical equipment for the needs of the given person. Broadly filtering then finely selecting is a way to accelerate the prediction of the best optical equipment for the given person by not comparing the given dataset to each of the reference datasets successively.

In an embodiment, selecting, among the plurality of N reference datasets, a group of R reference datasets, comprises: identifying a correlation between the given dataset and a plurality of R reference datasets among the plurality of N reference datasets, and selecting the R reference datasets based on the identified correlation to form the group of R reference datasets.

The correlation allows providing to the given person an optical equipment suiting their needs or tastes by trusting the inputs from reference persons which tastes or needs match those of the given person.

In an embodiment, identifying a correlation between the given data set and the plurality of R reference datasets comprises, for each of the N reference datasets, comparing the given scores of the given dataset with the reference scores of said reference dataset to obtain a number $N_c$ of concordant pairs and a number $N_d$ of discordant pairs associated to said comparison.

Counting concordant and discordant pairs helps quantifying a correlation between different datasets.

In an embodiment, a concordant pair corresponds to an absolute or a relative difference between the given score and the reference score being below a predetermined threshold, a discordant pair corresponds to an absolute or a relative difference between the given score and the reference score being equal to, or above, a predetermined threshold.

In an embodiment, selecting the R reference datasets to form the group of R reference datasets comprises obtaining, for each of the N reference datasets, based on the number $N_c$ of concordant pairs and on the number $N_d$ of discordant pairs associated to the comparison of the given scores of the given dataset with the reference scores of said reference dataset, the value of a parameter indicating a level of correlation with the given dataset, and selecting the R reference datasets for which the value of said parameter indicates the highest level of correlation.

In an embodiment, for each of the N reference datasets, the value of said parameter indicating a level of correlation with the given dataset is proportional to $N_C-N_D/k(k-1)$ with k being the number of optical equipments of said reference dataset.

The expression above takes into account the number of concordant pairs and discordant pairs, and weighs that value using the number of optical equipments rated in each reference dataset. In any case, two datasets having only concordant pairs will be considered to have the highest correlation. If two datasets have concordant pairs and discordant pairs, the correlation also depends on the number of optical equipments rated in each dataset.

In an embodiment, predicting (S4) at least one optical equipment for the given person among the plurality of optical equipments, comprises identifying a correlation among the reference datasets of the group of R reference datasets, and determining at least one optical equipment for the given person based on the identified correlation.

Indeed, based on the identified correlation, it is possible to determine which optical equipment would have the highest preference level among a group of R reference persons, chosen to rate optical equipments similarly to the given person, if all these reference persons had rated all the optical equipments.

In an embodiment, the given dataset comprises, for at least one pair of optical equipments being part of the given subset, a given preference level associated to the pair of optical equipments, the given preference level indicating a level of preference of the pair of optical equipments for the person, each reference dataset which each of the optical equipments forming the given subset is part of comprises, for at least the pair of optical equipments, a reference preference level being associated to the pair of optical equipments, the reference preference level indicating a level of preference of the pair of optical equipments for the reference person, comparing the given dataset with a plurality of reference datasets comprises selecting all the reference datasets associated to reference subsets which each of the optical equipments forming the given subset is part of, and for each selected reference subset, determining a preference function $p_{u(i,j)}$ based on a comparison between the given preference level and the reference preference level for at least one pair of optical equipments.

The preference function indicates which optical equipment of a pair of equipments is preferred by a reference person. By comparing the results of the preference functions between two datasets for the same pair of optical equipments, it is possible to determine whether the preference level is the same (concordant pair) or different (discordant pair) in both datasets.

In an embodiment, for the at least one pair of optical equipments, the preference function $p_{u(i,j)}$ for a (given en or reference) user u is incremented by a first value if the user u prefers item i to item j, and the preference function $p_{u(i,j)}$ is incremented by a second value opposite to the first value if user u prefers item j to item i. The preference value $p_{u(i,j)}$ is centered around zero.

For example, the first value may be set to +1 and the second value may be set to -1. Normalization of the preference function allows comparing two datasets without bias.

In an embodiment, each dataset is specified for an intended usage of the optical equipment by the person, and for each dataset the relative ranking of the at least two optical equipments applies to said intended usage.

It is thus possible, for example, to recommend a first optical equipment for a first specific usage and a second optical equipment for a second specific usage.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
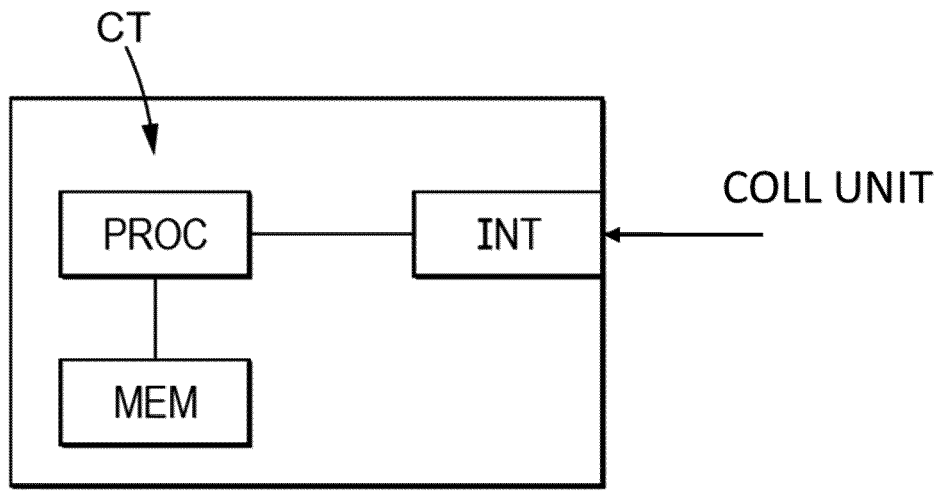
FIG. 1 depicts an example of a computer system adapted for implementing a method according to an embodiment of the invention.

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a system and conversely, all the technical features relative to a system can be transposed, individually or in combination, to a process.

It is now referred to [FIG. 1], which depicts a computer system according to an embodiment of the invention. The computer system comprises a centralized treatment unit (CT), comprising a processor (PROC) operably connected to a memory (MEM) and to a communication interface (INT) with a collecting unit (COLL UNIT). The collecting unit (COLL UNIT) is configured to collect, for a given person, a given dataset.

Figure 2:
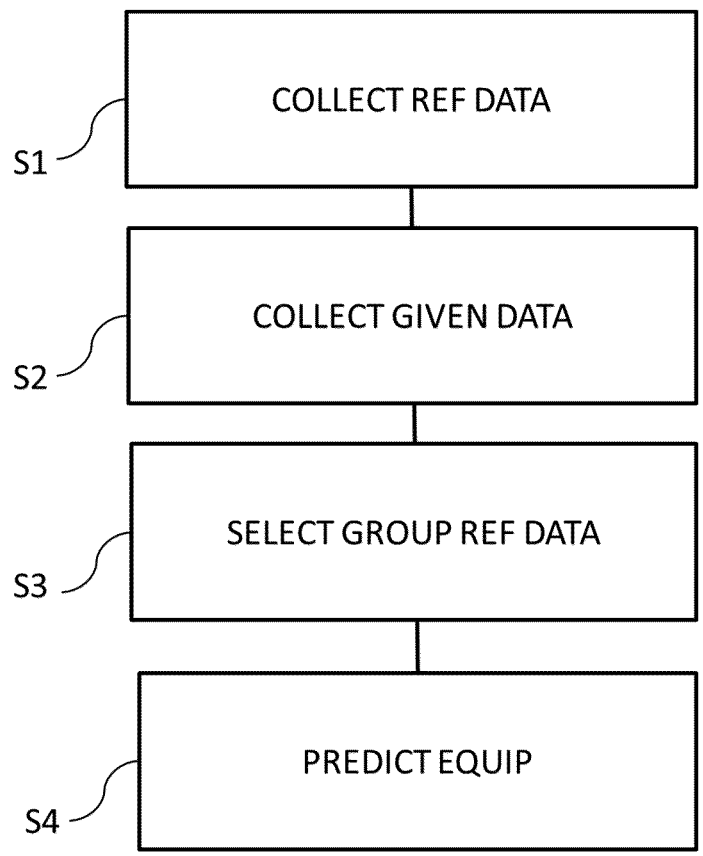
FIG. 2 depicts a flowchart of a general algorithm of a computer program for performing a method according to an embodiment of the invention.

It is now referred to [FIG. 2], which depicts a general algorithm of a computer program according to an embodiment of the invention. The computer program may be stored on the memory (MEM) to be executed by the processor (PROC).

For a plurality of reference persons, reference datasets are collected [COLLECT

REF DATA (S1)] by the collecting unit (COLL UNIT).

The collected reference datasets are transmitted to the centralized treatment unit (CT) to be stored on the memory (MEM) in the form of a database.

The database comprises, for each reference person (or for each category of reference persons) a reference dataset associated to said reference person (or to said category of reference persons).

Each stored reference dataset indicates at least two different items with an associated score or preference value. In other words, each stored dataset comprises an indication of which item among a selection of at least two items is best accepted by a reference person.

An "item" is to be understood, in the context of the disclosure, as referring either:
  to an optical equipment as a whole, or
  to an attribute of an optical equipment which may be for example a frame attribute such as a specific frame shape or a lens attribute such as a specific optical design, or
  to a set of attributes of an optical equipment.

In an embodiment, the database comprises, for each dataset, a preference value between different optical equipments. Each stored reference dataset thus indicates whether the reference person prefers a first optical equipment or a second optical equipment.

In an embodiment, the database comprises, for each dataset, a preference value between different attributes, such as between:
  different frame materials, or
  different bridge shapes, or
  different optical designs, or
  different filters, or
  different values for a specific optical design attribute such as field width, max cylinder, sphere, . . . .

At least one optical equipment attribute may include an optical design attribute of an optical lens of the optical equipment, a lens shape attribute of an optical lens of the optical equipment, a frame attribute of a frame of the optical equipment, and/or a global attribute of the optical equipment.

The optical lens attribute may relate to an optical design, a field width, a cylinder, a sphere, a lens material, a filter, a tint, a gradient, a class, and/or a usage such as BAU, digital intensive usage, driving, practicing a sport.

The optical lens treatment may relate to a filtering property provided by the optical lens or by a lens treatment of the optical lens, such as blue cut, UV cut, polarization The lens treatment attribute may relate to a non-filtering property provided by a lens treatment of the optical lens, such as anti scratch, anti reflective, anti rain, anti fog.

The frame attribute may relate to a frame color, a frame shape, a frame material, a size and/or a nose bridge type.

The attribute of the HMD design may relate to a weight, a weight distribution and/or a price.

In this embodiment, each stored reference dataset indicates whether the reference person generally prefers optical equipments sharing a first specific attribute (such as a first optical design) or optical equipments sharing a second specific attribute (such as a second optical design).

In an embodiment, the optical equipments may be grouped according to various categories, such as:
  EYEZEN® for optical lenses having an optical design adapted for a digital intensive usage,
  CRIZAL® for optical lenses having a combination of surface treatments for added properties including anti-scratch, anti-reflective, anti-rain, . . . .
  TRANSITIONS® for photochromic optical lenses which tint may vary depending on the current activity . . . .

Each category is further associated to a set of attributes shared by all the optical equipments belonging to said category. Each optical equipment may belong to any number of categories and may have any number of attributes.

In this embodiment, the database comprises, for each dataset, a preference value between different such categories. Each stored reference dataset may thus indicate whether the reference person generally prefers optical equipments sharing a first set of attributes or optical equipments sharing a second set of attributes.

Of course, it will be obvious to the skilled person that the above embodiments may be combined, such that for example, each stored reference dataset indicates that a reference person prefers a first optical equipment to a second optical equipment, and also that the reference person prefers a first attribute of the first optical equipment to a second attribute of the second optical equipment.

In an embodiment, the database may be represented as a 2D matrix containing a level of satisfaction associated to some optical equipment attributes or to some optical equipments.

An example of one such 2D matrix is a $S_{i,j}$ matrix containing the level of satisfaction for any reference person i and any items j. The $S_{i,j}$ matrix may be represented on N lines corresponding to N reference datasets for N reference persons and on R columns corresponding to R items. In this example, i is a positive integer from 1 to N and j is a positive integer from 1 to R. In each line, that is to say in each dataset, at least two items are associated to an absolute level of satisfaction. The matrix may be sparse. The level of satisfaction may be expressed as a score. The score may be binary (I like/I don't like). The score may belong to a value scale, for example between 1 to 10. As at least two items per dataset as associated to an absolute level of satisfaction, a hierarchy is obtained, for each dataset, between at least two items.

In an embodiment, the database may be represented as a 3D matrix containing for each reference person a preference level, or a ranking, between different items. In this case, for each dataset, at least two items are ranked with respect to one another.

An example of one such 3D matrix is a triangular Si,j,k matrix containing a preference level for any reference person i and any items j, k. In this example, i is a positive integer from 1 to N, and j and k are positive integers from 1 to R. The matrix can be sparse. For example, Si,j,k may be set to 1 if reference person i prefers item j to item k (j>k), Si,j,k may be set to −1 if reference person i prefers item k to item j (k>j) and Si,j,k may be set to 0, or left blank, if reference person i has not ranked item j with respect to item k.

At least part of the collected levels of satisfaction, scores, preference levels or rankings according to a reference person may be explicitly requested inputs from said reference person.

In an embodiment, the reference person is shown some simulation of attributes rendering (tint, optical design, filters, color . . . ) and asked their opinion. They can provide absolute or relative scores.

In an embodiment, the reference person is shown some simulation of how they could be perceived wearing specific optical equipments and asked their opinion. They can provide absolute or relative scores.

In an embodiment, the reference person is equipped with smart eyewear (electro-chromic trial, electro-focus trial . . . ) and asked their opinion on several aspects, such as different alternate attributes. They can provide absolute or relative scores.

In an embodiment, the reference person's previous optical equipment is analyzed using systems like an eye scanner to retrieve their current prescription value and to determine their eyewear choice in the past (for example a choice in terms of added value, frame shape, etc) and the reference person is asked to give their opinion about it.

In an embodiment, the reference person provides a written feedback after purchasing an optical equipment.

In an embodiment, different virtual optical equipments are provided to the reference person. The reference person may be provided a result of a simulation of attributes rendering for different optical equipments of the set of optical equipments, then based on such provided result of a simulation, the reference person is requested to provide an absolute score for at least two optical equipments, or a relative preference level for at least a pair of optical equipments.

For example, different specific optical designs may be chosen to be compared by the reference person. For each chosen optical design, the reference person may be shown a simulated view of a virtual scene through a lens having said specific optical design. Relative motion between the virtual scene and the reference person may also be simulated to show the visual impact of the optical design to the reference person. The reference person can express a preference between different optical designs, for instance by indicating levels of satisfaction or dissatisfaction.

Another example is to use virtual try-on technology to virtually fit an optical equipment to a reference person. The reference person may be provided a result of a simulation of how the reference person could be perceived wearing different optical equipments of the set of optical equipments, then This can be done for example using a computer system on which a facial recognition software module and a virtual try-on software module are installed. A picture of the reference person may be provided and analyzed using the facial recognition software module to determine facial features of the reference person. The virtual try-on module is provided the picture with the determined facial features and may access to a bank of several numerical models of different optical equipments. The virtual try-on software module may virtually fit the numerical model on the user face using the determined facial features, and the resulting image may be displayed to the reference person. based on such provided result of a simulation, the person is requested to provide an absolute score for at least two optical equipments, or a relative preference level for at least a pair of optical equipments.

Another example may be the simulation of an ophthalmic filter, by showing to the user a virtual scene and the impact on the scene of different colored filters.

At least part of the collected levels of satisfaction, scores, preference levels or rankings according to a reference person may be implicitly provided by said reference person.

In an embodiment, the online behavior of the reference person is analyzed (number of clicks, number of views, number of seconds spent on a page, list of viewed optical equipments, . . . ) and a score is deduced from their behavior.

The person behavioral dataset may include data such as a number of clicks, a number of views, a list of displayed optical equipments among a greater list of displayable optical equipments, a time spent displaying a particular optical equipment . . . .

For example, a user interface may be configured so that the person may select at least one optical equipment to be displayed from the set of optical equipments. The user interface may comprise a tracking module to track the time spent displaying each displayed optical equipment and to associate said time spent to said displayed optical equipment. Therefore:
- the subset of optical equipments may correspond to all displayed optical equipments,
- for a displayed optical equipment, the time spent displaying said displayed optical equipment may represent a given score associated to said displayed optical equipment,
- for the subset of optical equipments, a comparison of the time spent displaying each optical equipment of the subset may be performed to establish a preference level for each optical equipment of the subset.

In every situation, in particular when the reference person is shown some simulation of attributes rendering or using smart eyewear, they can be put in different daily situations eg: hiking in the mountains, climbing down the stairs, playing golf. In this context, the use case associated to the level of satisfaction may be stored as well in the matrix as a parameter or another matrix will be created associated to the specific use case. Saying it differently: for a same wearer, the score or preference between different optical equipments may depend on the use/activity. It is thus possible to add another dimension to the database, corresponding to different uses or activities.

Using said database, it is proposed to determine, for any person, a prediction of their level of satisfaction for any optical equipment attribute and to recommend them the right optical equipment accordingly.

In order to do so, for a given person, a given dataset is collected [COLLECT GIVEN DATA (S2)] by the collecting unit (COLL UNIT). The collected given dataset is transmitted to the centralized treatment unit (CT) to be stored on the memory (MEM). The given dataset may be collected and stored much like a reference dataset, according to any of the above embodiments.

In an embodiment, the database may be dynamic and updated anytime a person provides some explicit or implicit level of satisfaction on an optical equipment or on an attribute of an optical equipment. Therefore, the given dataset, for the given person, may be added to the database.

After storing the plurality of reference datasets and after storing the given dataset, a group of reference datasets is selected [SELECT GROUP REF DATA (S3)] by the centralized treatment unit (CT) among the stored plurality of reference datasets, based on the stored given dataset.

Based on the selected group of reference datasets, at least one optical equipment among the plurality of optical equipments is predicted [PREDICT EQUIP (S4)] by the centralized treatment unit (CT).

To predict the best item for the given person, a possibility is to obtain the predicted levels of satisfaction for said given person, for the items that they have not evaluated, then the item that gets the highest predicted level of satisfaction for the given person is predicted and recommended to the given person.

Alternately, a plurality of M items getting the M highest predicted levels of satisfaction may be predicted and recommended to the given person.

Recommending may be performed on a webpage, or in a store having a few stock keeping units, for example by filtering all other optical equipments and displaying only the recommended optical equipment or equipments to the given person, or by ordering the plurality of optical equipments to display the recommended one or ones on top of the webpage.

How the group of reference datasets is selected and how the at least one optical equipment is predicted may depend on the structure of the database and of the given dataset.

In an embodiment wherein the datasets comprise absolute scores for different items, a user-user collaborative filter may be used. For a given person u, a group of reference persons like them that agreed or disagreed with them in the past may be selected, in view of predicting the opinion of the given person u on an item i. In other words, selecting the group of reference datasets may comprise selecting the reference datasets which absolute scores for the same items are similar than that of the given dataset.

Similarity between the levels of satisfaction of the given person u and a reference person v may be assessed based on a level of correlation. This level of correlation may be obtained by computing the similarity of judgment between the datasets for the given person u and the reference person v. This computation is based on comparing their appreciation on at least two items j and k (both distinct from the item i, for which the level of satisfaction for the given person u is to be predicted).

A correlation is understood as following: both the given dataset and the reference datasets of the selected group of reference datasets comprise similar indications.

Examples of such indications may be:
equipment A is preferred to equipment B,
all (or most) equipments with feature C are preferred to all (or most) equipments with feature D,
both equipments A and B are preferred to equipment C, etc.

The level of correlation may be for example the Pearson correlation coefficient, the cosine similarity coefficient or the Kendall tau correlation coefficient.

In the case of the Pearson correlation coefficient, the level of correlation $s_{u,v}$ is determined, for each item on which the appreciation is to be compared, by applying the following formula:

$$s_{u,v} = \frac{\sum_{l \in I_{u,v}} (r_{u,l} - r_u)}{\sqrt{\sum_{l \in I_{u,v}} (r_{u,l} - r_u)^2} \sqrt{\sum_{l \in I_{u,v}} (r_{v,l} - r_v)^2}}$$

$I_{u,v}$ being the set of items for which the given person u and the reference person v have both given their level of satisfaction $r_{u,l}$ (respectively $r_{v,l}$) being the level of satisfaction of the given person u (respectively the reference person v) for item 1, $r_u$ (respectively $r_v$) being the mean of the levels of satisfaction of the given person u (respectively the reference person v) on the items of $I_{u,v}$.

In the case of the cosine similarity coefficient, the level of correlation $s_{u,v}$ is determined, for each item on which the appreciation is to be compared, by applying the following formula:

$$s_{u,v} = \frac{\sum_{l \in I_{u,v}} r_{u,l} \cdot r_{v,l}}{\sqrt{\sum_{l \in I_{u,v}} (r_{u,l})^2 \sum_{l \in I_{u,v}} (r_{v,l})^2}}$$

In the case of the Kendall tau correlation coefficient, the global level of correlation $s_{u,v}$ between the given dataset for the given person u and a reference dataset for the reference person v is determined by applying the following formula:

$$s_{u,v} = 2 \frac{N_c - N_d}{l(l-1)}$$

Nc and Nd being respectively the number of concordant pairs (i.e pairs for which the given person u and the reference person v have the same relative preference) and discordant pairs (i.e pairs for which the given person u and the reference person v have a different relative preference), and l being the total number of items that both users u and v evaluated.

The specifics of determining a correlation between a given dataset and a reference dataset as mentioned above also apply, in the same way, to determining a correlation between two reference datasets.

Such correlation may be determined prior to collecting the given dataset. That way, it is possible to implement the following sequence:

regrouping similar reference datasets according to groups,
preselecting a few reference datasets of different groups
of similar reference datasets,
after obtaining the given dataset, determining a correlation between the given dataset and the preselected few reference datasets, and
based on the determined correlations, selecting one of the groups of similar reference datasets.

The selection of the set of reference datasets "neighboring" the given dataset may be performed based on the level of correlation.

For example, a predetermined threshold may be provided, such that the reference datasets which level of correlation with the given dataset exceeds the predetermined threshold may all be selected to form the selected group of reference datasets.

The level of satisfaction $r_{u,i}$ of the given person u for the item i can be given by the following expression:

$$r_{u,i} = r_u + \frac{\sum_{v \in N_u} s_{u,v}(r_{v,i} - r_v)}{\sum_{v \in N_u} s_{u,v}}$$

$r_u$ being the means of the levels of satisfaction in the reference dataset for the given person u, Nu being a set of reference datasets "neighboring" the given dataset, each reference dataset of the set of reference datasets corresponding to a reference person v, v being an integer from 1 to Nu, $S_{u,v}$ being a level of correlation between the levels of satisfaction in the given dataset for the given person u and in the reference dataset for the reference person v, $r_{v,i}$ being the level of satisfaction of the reference person v for the item i, and $r_v$ being the means of the levels of satisfaction in the reference dataset for the reference person v.

The non-homogeneity of scoring between reference persons is thus removed by calculating, for each reference person v, the means $r_v$ of the ratings of said reference person v and then subtracting this calculated means from each of the ratings provided by said reference person v.

In an embodiment wherein the datasets comprise absolute scores for different items, an item-item collaborative filter may be used.

For a given person u, a group of reference persons that have the same way of characterizing attributes is selected.

At least one optical equipment, which said group of reference persons consider have the same attributes as an optical equipment that the given person u appreciates, is recommended to the given person u. Indeed, the given person will likely prefer optical equipments that share a high similarity with those already well appreciated.

A similarity indicator $s_{i,j}$ between how item i and item j have been rated by different reference persons can be obtained for example by applying the formula:

$$s_{i,j} = \frac{\sum_{u \in com(i,j)} (r_{u,i} - r_u)(r_{u,j} - r_u)}{\sqrt{\sum_{u \in com(i,j)} (r_{u,i} - r_u)^2 \sum_{u \in com(i,j)} (r_{u,j} - r_u)^2}}$$

com(i,j) being the set of users who scored in common the item i and the item j, $r_{u,i}$ being the level of satisfaction of the given person u for item i, $r_{u,j}$ being the level of satisfaction of the given person u for item j, and $r_u$ being the mean of the levels of satisfaction in the given dataset.

Alternative definitions and determinations of similarity indicators may be applied. Examples of known methods involve matrix factorization leveraging Single
Value decomposition (SVD) or non-negative matrix factorization (NMF).

The level of satisfaction $r_{u,i}$ of the given person u for an item i can be given by applying the formula:

$$r_{u,i} = \frac{\sum_{j \in I_u} s_{i,j} r_{u,i}}{\sum_{j \in I_u} s_{i,j}}$$

$r_{u,i}$ being the level of satisfaction of the given person u for item i, $L_u$ being a group of items that are rated by different reference persons similarly to item i, and $s_{i,j}$ being the similarity indicator between how item i and item j have been rated by different reference persons.

After predicting a level of satisfaction, or a score, for the given user for each item, the preferred optical equipment may be predicted by selecting the one with the highest level of satisfaction or score.

In an embodiment wherein the datasets comprise relative preference levels between different items, a ranking-oriented user-user collaborative filter may be used.

For a given person u, a group of reference people v that made similar choices as the given person u in their relative preferences on at least one common pair of items is selected. The relative preference for the given person u on another pair of items is predicted.

For the given person u, the relative preference on a pair of items (i, j) can be predicted with a preference function $\psi_u(i,j)$ as follows:

$$\psi_u(i, j) = \frac{\sum_{v \in N_{u,(i,j)}} s_{u,v} p_{u,(i,j)}}{\sum_{v \in N_{u,(i,j)}} s_{u,v}}$$

Su,v being the similarity coefficient between the given person u and a reference person v, which, as exposed above, may be determined by for example the Pearson correlation coefficient, the cosine similarity coefficient or the Kendall tau correlation coefficient, Pu(i,j) being a preference function, which is set equal to 1 if the given person u prefers item i to item j, and to −1 if the given person u prefers item j to item I, and Nu(i,j) is a group of reference persons selected for their similarity coefficient with the given person u exceeding a predetermined threshold.

Although representative processes and articles have been described in detail herein, those skilled in the art will recognize that various substitutions and modifications may be made without departing from the scope of what is described and defined by the appended claims.

Indeed, all the embodiments above, in particular using a user-user collaborative filter, an item-item collaborative filter, or a ranking-oriented user-user collaborative filter, may be modified to include an additional filter. The additional filter may be applied based on a selection input provided by the given person to the collecting unit. An example of additional filter may be to select only the optical equipments suitable for a specific activity or, generally, for a specific use case. In this case, the reference datasets may be filtered to form a sub matrix containing all the levels of satisfaction collected for the optical equipments suitable for this specific use case. In other words, part of the optical equipments are excluded for not being suitable for said specific use case.

In addition, the matrix may comprise, for a reference dataset, a plurality of levels of satisfaction for a same item, each level being associated to a specific use case. In this case, the reference datasets may be filtered so that at least part of the reference datasets may contain, for at least part of the items, a weighted average of the level of satisfaction associated to said use case.

The weighted average can be derived statically or dynamically from data analysis of consumer behaviours.

The invention claimed is:

1. A method for determining, for a given person, an optical equipment among a set comprising a plurality of optical equipments, the method being implemented by at least one processor, the method comprising:
   obtaining a plurality of N reference datasets stored on a memory,
   each reference dataset being associated to at least one corresponding reference person,
   each reference dataset being indicative of a relative ranking of at least two optical equipments forming a reference subset of the set of optical equipments;
   collecting, from a collecting unit, a given dataset associated to the given person,
   the given dataset being indicative of a relative ranking of at least two optical equipments forming a given subset of the set of optical equipments;
   each of the optical equipments forming the given subset being part of at least one reference subset;
   based on the given dataset, selecting, among the plurality of N reference datasets, a group of R reference datasets, R being a positive integer from 2 to N;
   based on the selected group of R reference datasets, predicting at least one optical equipment for the given person among the plurality of optical equipments; and
   displaying only the optical equipment to the given person or displaying the optical equipment as a prioritized result to the given person.

2. The method of claim 1, wherein each dataset comprises, for each of the optical equipments forming the subset, at least a score indicating a level of satisfaction of said optical equipment for the person.

3. The method of claim 2, wherein each dataset comprises, for each of the optical equipments forming the subset, at least one attribute score,
   each attribute score being associated to an optical equipment attribute of said optical equipment, and
   each score indicating a level of satisfaction of said optical equipment attribute for the person.

4. The method of claim 2, wherein at least one dataset comprises a preference level associated to a group of optical equipments comprising at least a first optical equipment and a second optical equipment being both part of the subset,
   the preference level indicating a level of preference of at least said first and second optical equipments for the person.

5. The method of claim 2, wherein collecting a reference dataset and/or collecting the given dataset comprises collecting the reference dataset and/or the given dataset directly from feedback of a wearer or from a measurement.

6. The method of claim 1, wherein each dataset comprises, for each of the optical equipments forming the subset, at least one attribute score,
   each attribute score being associated to an optical equipment attribute of said optical equipment, and
   each score indicating a level of satisfaction of said optical equipment attribute for the person.

7. The method of claim 6, wherein at least one dataset comprises a preference level associated to a group of optical equipments comprising at least a first optical equipment and a second optical equipment being both part of the subset,
   the preference level indicating a level of preference of at least said first and second optical equipments for the person.

8. The method of claim 6, wherein collecting a reference dataset and/or collecting the given dataset comprises collecting the reference dataset and/or the given dataset directly from feedback of a wearer or from a measurement.

9. The method of claim 1, wherein at least one dataset comprises a preference level associated to a group of optical equipments comprising at least a first optical equipment and a second optical equipment being both part of the subset,
   the preference level indicating a level of preference of at least said first and second optical equipments for the person.

10. The method of claim 9, wherein collecting a reference dataset and/or collecting the given dataset comprises collecting the reference dataset and/or the given dataset directly from feedback of a wearer or from a measurement.

11. The method of claim 1, wherein collecting a reference dataset and/or collecting the given dataset comprises collecting the reference dataset and/or the given dataset directly from feedback of a wearer or from a measurement.

12. The method of claim 1, wherein collecting a reference dataset and/or collecting a given dataset comprises:
   providing access to digital content/behavior of the person, and
   analyzing the digital behavior of the person so as to extract person parameters.

13. The method of claim 1, wherein the method further comprises determining a plurality of optical equipments and predicting an optical equipment by selecting said optical equipment among the determined plurality of optical equipments.

14. The method of claim 1, wherein selecting, among the plurality of N reference datasets, a group of R reference datasets, comprises:
   identifying a correlation between the given dataset and a plurality of R reference datasets among the plurality of N reference datasets, and
   selecting the R reference datasets based on the identified correlation to form the group of R reference datasets.

15. The method of claim 1, wherein predicting at least one optical equipment for the given person among the plurality of optical equipments, comprises:
   identifying a correlation among the reference datasets of the group of R reference datasets, and
   determining at least one optical equipment for the given person based on the identified correlation.

16. The method of claim 1, wherein:
   the given dataset comprises, for at least one pair of optical equipments being part of the given subset, a given preference level associated to the pair of optical equipments, the given preference level indicating a level of preference of the pair of optical equipments for the person, each reference dataset which each of the optical equipments forming the given subset is part of comprises, for at least the pair of optical equipments, a reference preference level being associated to the pair of optical equipments, the reference preference level indicating a level of preference of the pair of optical equipments for the reference person, comparing the given dataset with a plurality of reference datasets comprises:

selecting all the reference datasets associated to reference subsets which each of the optical equipments forming the given subset is part of, for each selected reference subset, determining a preference function $p_{u,(i,j)}$ based on a comparison between the given preference level and the reference preference level for at least one pair of optical equipments.

17. The method of claim 1, wherein each dataset is specified for an intended usage of the optical equipment by the person, and for each dataset the relative ranking of the at least two optical equipments applies to said intended usage.

18. The method of claim 1, wherein the group of R reference datasets is selected based on a similarity of relative rankings between the given dataset and the reference datasets.

19. A non-transitory computer readable medium having stored therein a computer program comprising one or more stored sequences of instructions that is accessible to a processor and which, when executed by the processor, causes the processor to carry out the steps of the method of claim 1.

20. A system for determining, for a given person, an optical equipment among a set including a plurality of optical equipments, the system comprising at least one processor configured to:

obtain a plurality of N reference datasets stored on a memory, each reference dataset being associated to at least one corresponding reference person, each reference dataset being indicative of a relative ranking of at least two optical equipments forming a reference subset of the set of optical equipments;

collect, from a collecting unit, a given dataset associated to the given person, the given dataset being indicative of a relative ranking of at least two optical equipments forming a given subset of the set of optical equipments;

each of the optical equipments forming the given subset being part of at least one reference subset;

based on the given dataset, select, among the plurality of N reference datasets, a group of R reference datasets, R being a positive integer from 2 to N;

based on the selected group of R reference datasets, predict at least one optical equipment for the given person among the plurality of optical equipments; and display only the optical equipment to the given person, or display the optical equipment as a prioritized result to the given person.

* * * * *